Feb. 18, 1958     W. TILLSON     2,823,945
WELL BIT RETRIEVING DEVICE
Filed Nov. 14, 1955
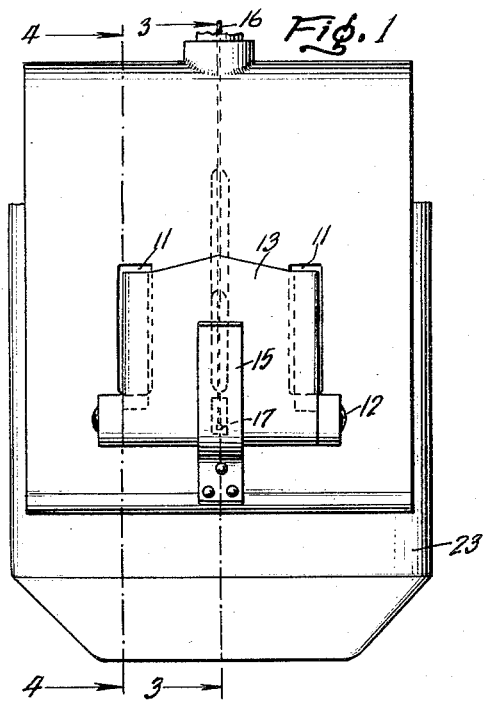
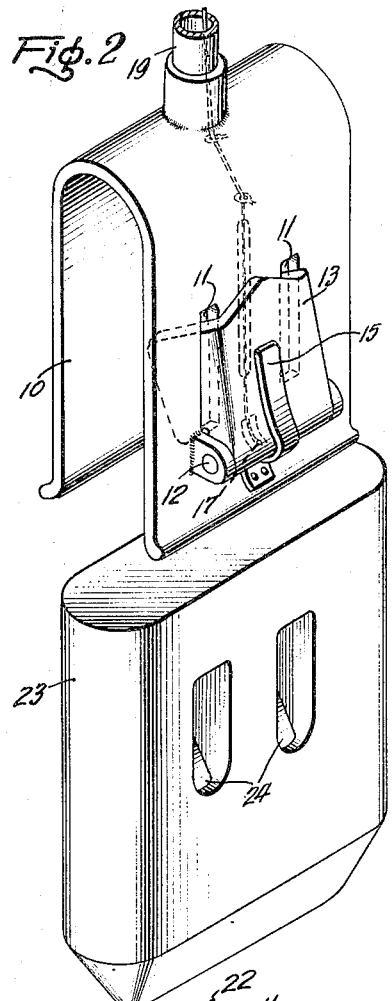
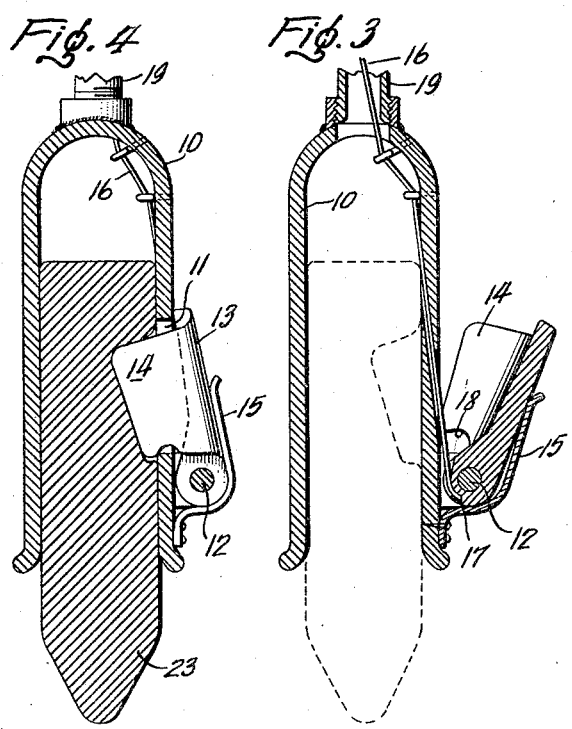
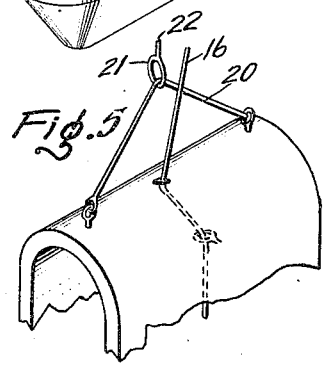
INVENTOR.
William Tillson
BY Andros and Smith
His Attorneys

United States Patent Office 2,823,945
Patented Feb. 18, 1958

2,823,945

WELL BIT RETRIEVING DEVICE

William Tillson, Ravena, N. Y.

Application November 14, 1955, Serial No. 546,603

6 Claims. (Cl. 294—86)

This invention relates to a fishing tool for recovering the bit or point of a well drill lost at the bottom of an incomplete well.

Many fishing devices to retrieve elongated objects such as "strings," pipes, rods and so forth are known but such fishing tools are entirely ineffective in retrieving drill points.

It has been the custom when a drill point (or insert) is lost in the well to continue to drill with a new point. Obviously with such customary procedure the lost point must be smashed into fragments by the new point as though it were a stone in the well bottom, and since the new point is no more durable than the lost one it often occurs that several new points are consumed before the well is cleared and the drilling can proceed.

It is therefore, an object of the present invention to provide a fishing tool by which well drill points (also called inserts, or bits), may be removed from the bottom of the well.

It is a further object of the present invention to provide a fishing tool that can positively engage a drill point to extract it from the well, and which may be operated to disconnect the point if it should jam in the well as it is being withdrawn.

Other and further objects and advantages of the device will be clear from the following specifications, taken with the accompanying drawing in which like characters of reference refer to like parts in the several views, and in which:

Figure 1 is an elevation of the device in use for lifting a drill point.

Figure 2 is a perspective view of the device of Figure 1 as it is being lowered over a drill point.

Figure 3 is a section on line 3—3 of Figure 1.

Figure 4 is a section on line 4—4 of Figure 1.

Figure 5 is a fragmentary perspective view of a fishing tool of the present invention, showing a different suspension means.

Referring to the drawings, it is seen that the tool comprises a U-shaped hood or housing 10, having two slotted openings 11 in one side. Hinged below these openings on a pin 12 is a locking means 13 having hooks or prongs 14 extending into the body of the U-shaped hood through openings 11. Prongs 14 are normally held in this position by a light spring 15 bearing against locking means 13.

Attached to the bottom of locking means 13 is a thin flexible wire 16. This wire passes upwardly through the U-shaped hood at the closed end. As seen in Figure 3 this wire is so fastened to the bottom of locking means 13 at 17, that by pulling on wire 16, locking means 13 is rotated about pin 12 to retract prongs 14 from openings 11 against the light spring 15. The fit between pin 12 and locking means 13 is somewhat loose so that there is slight vertical play between locking means 13 and U-shaped hood 10. The lower edge of prongs 14, it will be noticed, are provided with notches 18 that hook over the bottom end of openings 11 as seen in Figure 4. Tension on wire 16, to retract prongs 14 will raise locking means 13 on pin 12 and so release notches 18 from engagement with hood 10.

Hood 10 is preferably mounted on the lower end of a pipe 19, by which the hood element may be lowered into the well and manipulated, and unlatching wire 16 may pass upward through this pipe to be manipulated from above.

Figure 5 shows an alternative means to lower the tool into the well comprising a bail 20 passing through an eye 21 of a lowering wire 22.

The bit or point 23 is a standard item in common use and, as seen in Figure 2 has cavities 24 in its side to receive set screws to hold it in the shank of the drill. As seen in Figures 3 and 4 it is these cavities 24 that are to be engaged by prongs 14 to effect a positive grip of the fishing tool on the drill point. It will be apparent therefore that if hood 10 should engage the point in the reverse position it will be immediately apparent to the operator as the slack in wire 16 will not be taken up as it is when prongs 14 seat in cavities 24.

In operation to retrieve a lost drill point the U-shaped hood 10 is lowered into the well until it contacts the upper edge of the point. This contact may be crosswise of the point, in which case the hood is turned until, when it becomes parallel with the point, the slightly flared edges of hood 10 will guide the upper edge of the point into the hood. As the hood drops down over the point the upper edge of the point strikes the lower edge of the prongs 14 and slightly lifts the locking means and pivots it outwardly against spring 15. Slack then appears in wire 16 which, as the hood drops still further will disappear when the prongs 14 drop into cavities 24. When the slack is taken up by spring 15 pushing the prongs into cavities 24, the point may be withdrawn from the well. If it is found desirable to release the point after it has been engaged, it is only necessary to give wire 16 a sharp tug which will lift notches 18 of prongs 14 out of engagement with the lower end of openings 11 and will swing locking means 13 about pin 12 to disengage prongs 14 from cavities 24.

It will thus be seen that the objects hereinbefore set forth may readily and efficiently be attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention what I claim as new and desire to secure by Letters Patent is:

1. A fishing tool for a flat well drill point having side wall cavities to receive a holding member to secure it in the shank of a drill, comprising a U-shaped hood having flat parallel side walls, one of which walls is provided with openings adapted to be brought into alignment with said cavities; means secured to the closed end of said hood by which it may be manipulated in a well by an operator above ground; a second U-shaped member, comprising the only essential locking means required to recover said point, having flat parallel side walls each of which terminates in a prong normally extending into said hood through said openings and adapted to engage said cavities, said locking means being pivotally mounted exteriorly of one side wall of said hood; biasing means for said locking means; and means extending from said locking means through said hood along said manipulating means to a zone above ground to indicate when said prongs have engaged said cavities and being operable from above ground by which said locking means can be actuated to retract said prongs from said hood.

2. The fishing tool of claim 1 in which said means by which said locking means may be actuated comprises a flexible wire secure to said locking means.

3. The fishing tool of claim 1 in which the means by which the U-shaped hood may be manipulated comprises at least one length of pipe.

4. The fishing tool of claim 1 in which the means by which the U-shaped hood may be manipulated comprises a wire secured to a bail on said hood.

5. The fishing tool of claim 1 in which said locking means is provided with a pivot at its lower edge on the outside of said U-shaped hood and said biasing means comprises a light spring by which said locking means is spring pressed to normally hold each said prong in position extending into said hood.

6. The fishing tool of claim 5 in which a flexible wire comprises the means by which said locking means may be actuated, one end of said wire passing part way about the pivot of said locking means and the other end extending upwardly through said pipe for actuation by the operator, whereby tension in said wire will rotate said locking means about its pivot to retract said prong from said U-shaped hood.

References Cited in the file of this patent

UNITED STATES PATENTS

| | | |
|---|---|---|
| 1,172,180 | Trevino | Feb. 15, 1916 |
| 1,326,566 | Boyd | Dec. 30, 1919 |
| 1,369,963 | Carlson | Mar. 1, 1921 |
| 1,558,902 | Ligon | Oct. 27, 1925 |
| 1,731,970 | Carlson | Oct. 15, 1929 |
| 1,780,699 | Brown | Nov. 4, 1930 |
| 2,155,365 | Rankin | Apr. 18, 1939 |
| 2,309,948 | Goebel | Feb. 2, 1943 |
| 2,322,164 | Scudder | June 15, 1943 |
| 2,346,038 | Mason | Apr. 4, 1944 |
| 2,487,738 | Stehberger | Nov. 8, 1949 |
| 2,682,414 | Richardson | June 29, 1954 |
| 2,730,985 | Wingate | Jan. 17, 1956 |

FOREIGN PATENTS

| | | |
|---|---|---|
| 86,413 | Switzerland | Sept. 1, 1920 |